United States Patent [19]

Allan et al.

[11] Patent Number: 4,795,306

[45] Date of Patent: Jan. 3, 1989

[54] FORCE SENSOR

[75] Inventors: Donald R. Allan, Menlo Park; Bruce E. Shimano, Hacienda Heights, both of Calif.

[73] Assignee: Adept Technology, Inc., Sunnyvale, Calif.

[21] Appl. No.: 931,960

[22] Filed: Nov. 24, 1986

Related U.S. Application Data

[63] Continuation of Ser. No. 741,251, Jun. 4, 1985, abandoned.

[51] Int. Cl.[4] .............................................. B66C 23/00
[52] U.S. Cl. ..................................... 414/744.8; 901/29; 901/49
[58] Field of Search ................... 414/1, 5, 730, 744 A; 901/28, 29, 33, 34, 47, 49

[56] References Cited

U.S. PATENT DOCUMENTS

| 3,951,271 | 4/1976 | Mette | 414/730 |
|---|---|---|---|
| 4,540,331 | 9/1985 | Stanner et al. | 414/730 |
| 4,714,865 | 12/1987 | Chin et al. | 901/49 |

Primary Examiner—Joseph E. Valenza
Attorney, Agent, or Firm—Flehr, Hohbach, Test, Albritton & Herbert

[57] ABSTRACT

An end effector comprises a force sensor cooperating with an output flange at the wrist of a robot arm. The force sensor includes a cylinder mounted in the robot arm having a piston whose outer end is attached to the output flange of the arm at its outer end; its inner end comprising one side of a pressure chamber pressurized to a known level. The piston is mounted on bushings for sliding linear movement within the sleeve of the piston along the axis of vertical movement of the arm, but levers or other mechanisms may be used to provide the required motion. The pressure in the chamber is calibrated to a known level of a pressure which is to be applied to the part being worked by the end effector. The piston carries a position encoder; when the pressure within the pressure chamber is exceeded, movement of the position encoder is detected and signaled to a position controlling computer. Depending on the choice of the operator, the pressure may increase or the movement of the end effector may be stopped, eliminating possible damage to the part or robot. An ear is positioned adjacent to the end effector extending to be held in place between two rollers mounted on the robot arm or quill. These rollers may be tightened against the end of the ear, so that the ear may move freely vertically along the axis of movement of the end effector, while effectively bracing the end effector so that with rotation of the robot quill, the force of rotation of the quill is accurately and positively transmitted to the end effector. The position encoder comprises a linear strip mounted to pass between the phototransistor and light of a photodetector. Slotting of the linear strip will provide a quadrature data output indicating both direction and speed of movement of the shaft carrying the strip.

3 Claims, 2 Drawing Sheets

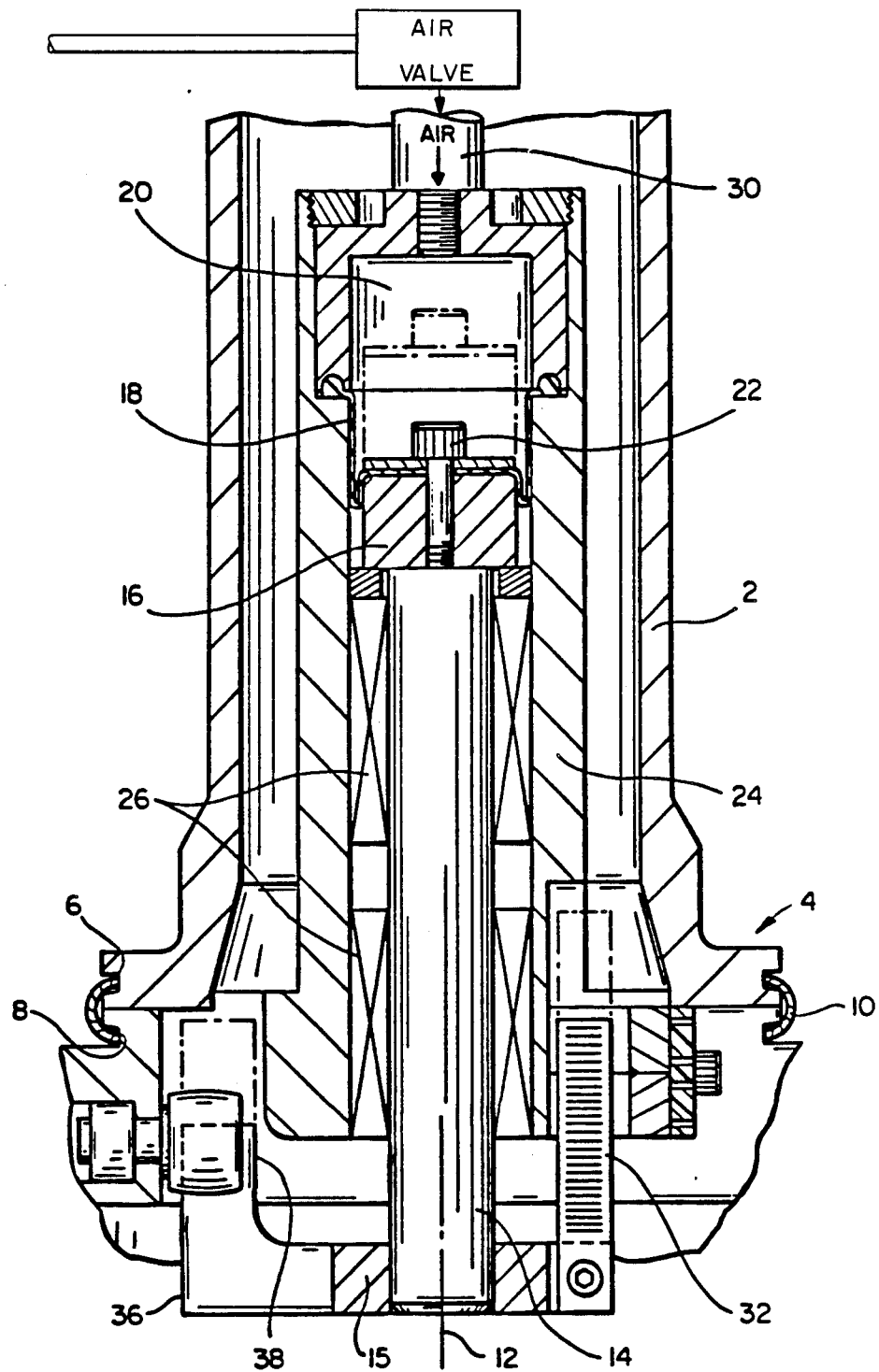
FIG_1

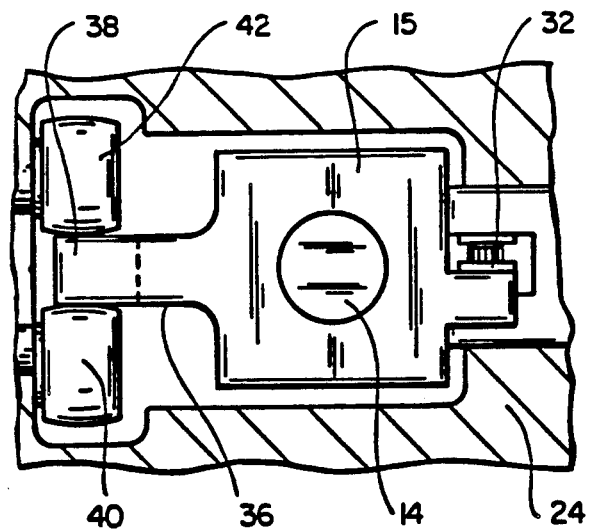
FIG_2
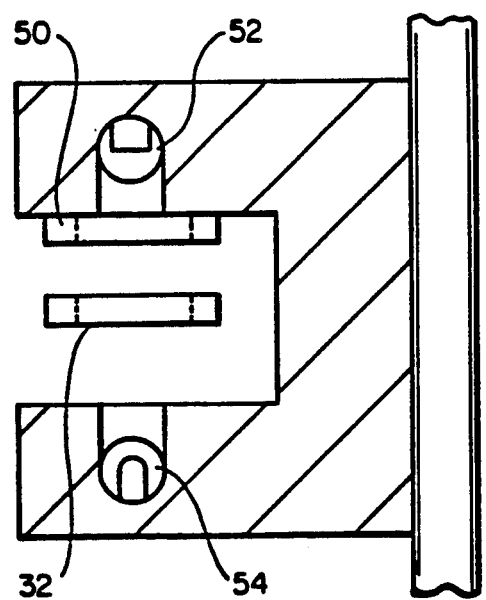
FIG_3

FORCE SENSOR

This is a continuation of application Ser. No. 741,251, filed June 6, 1985, now abandoned.

This invention is directed generally to the field of robotics and more particularly to a force sensor for a robot.

The present invention is especially useful with a high speed robot of the type described in U.S. application Ser. No. 694,585, filed Jan. 24, 1985, and entitled Direct Drive Robot System. This application is incorporated herein by reference.

With the advent of robots of the types described in the above referenced application, the use of robots for material handling and light assembly application has become more feasible. A robot arm which is movable both about a horizontal axis and along a verticle axis, with high speed movement along a vertical axis, is very useful in parts acquisition from feeders and for part mating and insertion applications.

However, a long-standing difficulty in this field has been that if a part to be inserted is not properly aligned with the receptacles, or if an effector which is to grasp a part is not properly aligned with the part, then undue pressure can be applied to the part and damage may quickly result.

Prior art efforts to detect this undue pressure have typically incorporated a spring and limit switch. Unfortunately, such an arrangement typically either is set at too sensitive a level, resulting in constant interruptions of work, or to too insensitive a level, resulting in unwanted damage to the parts being manipulated or even the robot itself.

It is an objective of the present invention to provide an improved force sensor for use with the end effector of a robot arm.

It is a further objective of the present invention to provide a force sensor which may be controlled to program the force which will be applied to the part being handled.

Yet another objective of the present invention is to provide a compliant programmable force sensor.

In part insertion operations, it is especially desirable in some circumstances to first determine a part is properly aligned with the receptacle in which it is to be inserted, using one level of pressure as the defined limit, and then to increase the pressure in order to force the part rapidly into the aligned receptacle to firmly seat the part and to maximize the speed of insertion.

Therefore, it is an objective of the present invention to provide a programmably controlled pressure varying force sense for part removal and insertion.

Where parts are being inserted or picked up under relatively light pressures, it has been found that the end effector may occasionally be effectively bouncing, i.e., moving rapidly back and forth relative to the work surface, because of the light loading pressure behind the effector. It is highly desirable to be able to constantly monitor the direction of movement and speed of movement of the end effector. Therefore, it is an objective of the present invention to incorporate in the force sensor to be used with the end effector a position detector which provides information indicating the direction of movement and rate of movement of the end effector at all times.

Another difficulty with prior pressure sensitive end effectors is that because of the mounting format typically used, they are able to insert little or very limited torque against the part being handled.

Therefore, it is an objective of the present invention to provide a mounting for the output flange on the end of the force sensor which is capable of so holding the output flange as to exert considerable torque against any part being held, without interfering with the sensitivity of the force sensor in detecting the pressure applied.

The above and other objectives of the present invention are accomplished in an end effector comprising a force sensor cooperating with an output flange at the wrist of a robot arm. The force sensor includes a cylinder mounted in the robot arm having a piston whose outer end is attached to the output flange of the arm at its outer end; its inner end comprising one side of a pressure chamber pressurized to a known level. In the attached drawing, the piston is mounted on bushings for sliding linear movement within the sleeve of the piston along the axis of vertical movement of the arm, but levers or other mechanisms may be used to provide the required motion. The pressure in the chamber is calibrated to a known level of pressure which is to be applied to the part being worked by the end effector. The piston carries a position encoder; when the pressure within the pressure chamber is exceeded, movement of the position encoder is detected and signaled to a position controlling computer. Depending on the choice of the operator, the pressure may increase or the movement of the end effector may be stopped, eliminating possible damage to the part or robot.

An ear is positioned adjacent to the end effector extending to be held in place between two rollers mounted on the robot arm or quill. These rollers may be tightened against the end of the ear, so that the ear may move freely vertically along the axis of movement of the end effector, while effectively bracing the end effector so that with rotation of the robot quill, the force of rotation of the quill is accurately and positively transmitted to the end effector.

In an especially useful embodiment of the invention, the position encoder comprises a linear strip mounted to pass between the phototransistor and light of a photodetector. Slotting of the linear strip will provide a quadrature data output which indicates both direction and speed of movement of the shaft carrying the strip.

The present invention will be described with reference to the following drawings:

FIG. 1 is a side elevational view of a preferred embodiment of the present invention mounted within a robot quill which carries a working hand of a robot;

FIG. 2 is an end view of the end effector of the robot hand of FIG. 1 showing especially the eccentric mounting of the end effector;

FIG. 3 is a detailed view of the relative positioning of the phototransistor and linear encoded strip which comprise the position encoder utilized in the preferred embodiment of this invention.

As indicated above, the force sensor of the present invention is disclosed as it is incorporated in the rotating quill of the working robot hand of the direct drive robot described in the patent application referenced above. However, the principles of this invention are clearly adaptable by persons of skill in this technology to use with other robots, and may be extended to additional translational and rotational degrees of freedom.

The quill 2 of the robot carries on its end an end effector indicated generally at 4. The end of the quill includes a groove 6 and the top of the end effector includes a similarly shaped groove 8. A split ring 10 is clamped into these two grooves to hold the end effector 4 tightly against the end of the quill 2 for movement vertically along the axis 12 as well as rotationally around the axis.

The shaft 14 of the force sensor terminates at one end against the output flange 15, and at its other end carries a piston 16. A diaphragm 18 seals the end of the pressure chamber 20 against the top of piston 16; a bolt 22 passes through the diaphragm and into the interior of the shaft 14 to tightly fasten the piston 16 against the top of shaft 14. Shaft 14 is mounted for easy sliding movement within the sleeve 24 of the force sensor using antifriction linear bushings generally indicated at 26 of a type well-known in this technology.

Air is supplied to the chamber 20 through a selection valve 30 which may be of either a vented or non-vented type as discussed below.

To track the movement of the force sensor, a position detector comprising a linear strip 32 and photocell (FIG. 3) is provided. The linear strip 32 is mounted for movement with the shaft 14, as indicated by the dotted outline. The linear strip has openings therein which pass between a pair of lights 54 and aligned phototransistors 52 of the photodetector. By providing a slotted mask 50 in front of the photodetector, a quadrature output is obtained which can be used by a computer to determine both the speed and direction of movement of the piston in accordance with known principles.

In order to convey rotational torque to the output flange 15 (FIG. 2), the flange is provided with a bent finger 36 which extends to the side of the flange and includes a portion 38 extending vertically parallel to the axis of movement 12. This extended finger portion 38 is captured between two rollers 40, 42. These rollers are eccentrically mounted as indicated at 44 to allow for tight adjustment against this vertical extension of the ear. The rollers are tightened against the finger to prevent rotation of the flange relative to the end effector, so that the output flange rotates directly with the quill 2 and accurately conveys the positional movement of the quill 2 to the part being handled by the robot.

As to the operation of the force sensor, by providing program control of the air valve 30 in accordance with technology which is well known in the art, the force applied to the diaphragm 18 and thereby to the piston 16 can be accurately controlled. Further, by providing the linear encoder movable with the piston, one can immediately create quadrature output signals to detect how far and fast deflection occurs (as explained above). In this way, a compliant programmable force sensor is provided.

For example, if considerable upward pressure is being exerted against the output flange or end effector, this will be reflected in an upward movement of the shaft 14 and its position encoder 32, which can immediately be detected to stop further movement of the quill.

Alternatively, light pressure may be used to handle lightweight or delicate parts. In prior art systems, the end effector occasionally wobbles or bounces when springs were used in the force sensor. By using this programmable force sensor, when wobble or bouncing is detected through rapid movement of the linear strip 32 through the photodetector, pressure can be briefly increased to stop the wobbling movement, and then decreased.

As mentioned above, the air valve 30 may either be vented or non-vented. In the vented type, if the pressure climbs to a set value, the valve vents to air to maintian the said value. This can be used to provide a linear spring pressure response. With the non-vented valve, there is no venting to air so that the pressure within the diaphragm continues to increase.

In the present embodiment, it is more typical to use a vented valve so that the pressure will stay at the predetermined force.

Because this is a computer controlled system, the pressure could be stepped up under computer control if desired. This is especially useful in the positioning and insertion of parts where, for example, the part can be grasped by the output flange of the end effector and preliminarily positioned relative to the receptacle; then the computer can increase the pressure to force the part in. This maximizes the speed of movement of the robot in its tasks.

In summary, the present invention provides a force sensor which gives compliance to the wrist of a high speed robot arm. If parts jam, the compliance arm compresses; if the jamming continues, the compression movement of the end effector is detected and further movement of the output flange is stopped. By using a pneumatic outer cylinder to control the pressure under computer control, a varying spring constant is created which can be used to detect potentially damaging pressures in a wide range of different applications without human intervention. The use of a strip linear encoder in combination with a photodetector detects movement of the force sensor both in terms of speed and direction, and provides the necessary signals to the computer controller to immediately stop unwanted movement of the robot arm.

Other embodiments of the present invention may become apparent to a person of skill in the art who studies the subject invention disclosure. Therefore, the scope of the present invention is to be limited only by the following claims.

What is claimed:

1. An end effector at the end of a robot quill capable of movement vertically along an axis defined by the centerline of the quill for handling parts under program, control including an improved force sensor comprising a cylinder supported by said quill having a piston movable in the cylinder along the axis of vertical movement of said quill, a shaft mounted for sliding movement along said vertical axis carrying at one end an output flange, means on the output flange which cooperate with means carried on the quill to cause the flange and the quill to rotate together while permitting sliding movement of said flange along the vertical axis in response to contacting said parts, pressure means for controlling the force applied to said piston and said shaft by altering the air pressure in said cylinder, sensor means comprising a shaft position detector for detecting movement of said shaft and said output flange relative to said quill, and computing means for altering the pressure applied through said cylinder in response to movement of said output flange detected by said sensor means.

2. Apparatus as claimed in claim 1 wherein the sensor means comprises a light source and photodetector mounted stationary relative to said robot quill, said encoder being movable with said shaft and comprising a slotted strip movable between said light and photodetector, the output of said sensor means being conveyed to said computer means.

3. Apparatus as claimed in claim 1 wherein said means on the output shaft comprise an arm extending from said output flange perpendicular to said movement axis and having at the distal end thereof a finger extending substantially parallel to said axis, and said means mounted on the quill comprise a pair of rollers mounted stationary relative to said output flange for allowing axial movement of said flange along said vertical axis relative to said quill while conveying rotational torque of said quill to said flange.

* * * * *